July 17, 1962   A. L. McCLOSKEY ETAL   3,044,943
SEPARATION OF METHYL BORATE-METHANOL AZEOTROPE
Filed Feb. 12, 1958
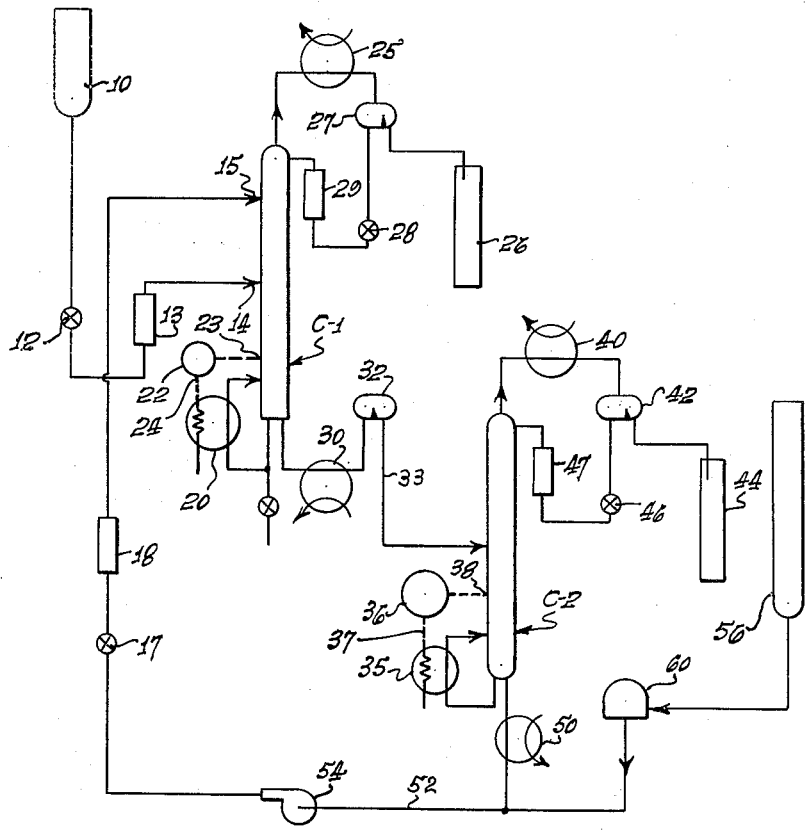
ALLEN L. McCLOSKEY,
DONALD S. TAYLOR,
HOWARD STEINBERG,
INVENTORS.

3,044,943
SEPARATION OF METHYL BORATE-METHANOL AZEOTROPE

Allen L. McCloskey, Orange, Donald S. Taylor, Whittier, and Howard Steinberg, Fullerton, Calif., assignors to United States Borax & Chemical Corporation, Los Angeles, Calif., a corporation of Nevada
Filed Feb. 12, 1958, Ser. No. 714,850
3 Claims. (Cl. 202—39.5)

This invention relates generally to the production of trimethyl borate, and, more particularly, to improved methods for separating trimethyl borate and methanol.

Methyl borate $B(OCH_3)_3$ forms with methanol ($CH_3OH$) an azeotropic mixture which typically contains about 75% methyl borate by weight and boils at about 54° C. Methods are known for preparing methyl borate, for example by reaction of methanol and boric acid ($H_3BO_3$), which are potentially economical, but which yield the ester in the form of this azeotrope rather than as the pure ester. An economical and convenient method for separating methyl borate from the methyl borate-methanol azeotrope is therefore of primary importance in the production of methyl borate.

Various procedures have been devised for obtaining such separation, such, for example, as addition of inorganic salts and washing with strong acids. However, all previously available procedures suffer from one or more practical disadvantages, such as excessive loss of product, difficulty of producing a product of high purity, complexity and expense of apparatus or of procedure, and the like.

We have discovered an entirely distinct procedure which avoids such disadvantages. We have found that methyl borate can be effectively and economically recovered from its azeotrope with methanol by distilling the mixture in a still equipped with a reflux column and introducing into the reflux column during distillation an organic solvent which selectively inhibits distillation of one of the components of the mixture. The other component is obtained, typically in substantially pure form, as distillate, while the first component may be recovered by conventional methods from the residue.

In accordance with the invention, we employ for such extractive distillation an organic solvent having a boiling point in the range between about 100 and about 275° C. That range is well above the boiling points of methyl borate and methanol, both of which are approximately 65° C. The distillate is then not appreciably contaminated with solvent, and the solvent in the residue is readily separable by distillation from the residual component of the azeotrope.

We have found that suitable solvents for inhibiting the distillation of methyl borate from its azeotropic mixture with methanol are substantially non-polar organic solvents having boiling points within the described range. When such substantially non-polar organic solvents are employed for extractive distillation of the azeotrope, the distillate is primarily methanol and the methyl borate is retained with the solvent in the still pot. Particularly effective solvents of that type are the paraffinic hydrocarbons containing from about eight to about fifteen carbon atoms per molecule, such as octane, decane and kerosene, for example; aromatic hydrocarbons containing either one or two non-fused aromatic nuclei, and their halogen and short-chain alkyl derivatives, such as biphenyl, xylene and dichlorobenzene, for example; and ethers of mononuclear aromatic radicals, such as diphenyl ether, for example.

We have discovered further that the distillation of methanol from its azeotropic mixture with methyl borate can be inhibited by addition to the fractionation column of a polar organic solvent which contains an unshared pair of electrons on an atom of oxygen, nitrogen or sulphur. Illustrative examples of such solvents having boiling points within the defined range and which have been found to produce effective separation of the components of the azeotropic mixture are short-chain mono- or di-alkyl N-substituted formamide, acetamide and propionamide, such as dimethylformamide, diethylformamide, methylacetamide, dimethylacetamide and methylpropionamide, for example; dimethylsulfoxide; and phenol and short-chain alkyl derivatives of phenol, for example cresol. Extractive distillation with polar solvents of that type yields trimethyl borate, typically in substantially pure form, directly as distillate.

An illustrative manner of carrying out the invention is represented by the schematic flow sheet of the accompanying single FIGURE.

The separation of the azeotrope takes place in extraction column C–1, to which it is supplied continuously at a controlled rate via the valve 12 and flowmeter 13 from a source indicated schematically at 10. Azeotrope source 10 may be considered to represent an apparatus of known type for producing the azeotropic mixture of methyl borate and methanol, typically in a weight ratio of 3:1. The azeotrope is typically supplied to column C–1 at a point intermediate its length, indicated at 14.

The selected organic solvent is supplied to column C–1 at a point near the top of the column, indicated typically at 15. The solvent is preferably supplied continuously via the control valve 17 and flowmeter 18 at a rate which is suitably related to the flow of azeotrope, the optimum relation of those flow rates depending upon the particular solvent used. Heat is typically supplied to column C–1 by means of a reboiler indicated schematically at 20. The rate of heating may be controlled in any suitable manner, an automatic control mechanism being represented at 22 which is responsive to a sensing means 23, such as a thermocouple, located at a suitable intermediate position in the column. Operating connections between sensing means 23, control mechanism 22 and heating device 20, are indicated by the dashed lines 24. Controller 22 is typically adjustable to maintain any selected temperature value at sensing means 23.

Depending upon the solvent employed, either trimethyl borate or methanol is taken at the top of column C–1 and condensed in the heat exchanger 25. A selected portion of this distillate can be metered back from the level controller 27 via the control valve 28 and flow meter 29 to the top of the column to attain a proper reflux ratio. The remainder of the distillate is delivered to a receiving vessel, indicated at 26. The excess solvent and the other component of the azeotrope are removed as residue from the still pot via the heat exchanger 30, and are supplied via the bottoms level controller 32 and the line 33 to the solvent recovery column C–2.

Stripping column C–2 is heated by the reboiler 35, typically under automatic control of a regulator 36 which acts via the dashed line 37 and which maintains a selected temperature at the sensing means 38, suitably positioned in the column. The distillate from column C–2, consisting essentially of the component of the initial azeotrope not removed in C–1, is condensed in the heat exchanger 40 and is supplied via the level controller 42 to a receiving vessel indicated at 44. A portion of that distillate may be returned via the valve 46 and flow meter 47 to the column to maintain the desired reflux ratio.

The bottoms from column C–2 are the spent solvent, which is removed via the heat exchanger 50 to line 52, whence it is returned as by the pump 54 to valve 17 for supply to column C–1 as already described. Make-up solvent may be supplied to line 52 from a supply indicated at 56 via a level control device 60, which is typically of float type. Breathing tubes equipped with suitable drying means to exclude atmospheric moisture may be provided in conventional manner, and are not explicitly shown in the drawing.

In operation of the described system, the solvent which is employed to inhibit distillation of one component of the azeotrope is continuously recycled, and only a small amount of make-up solvent is ordinarily required. Of the azeotrope introduced from source 10, one component is recovered from the head of column C–1 and delivered to receiver 26, while the other component is recovered from the head of column C–2 and delivered to receiver 44. One of those components is the primary product trimethyl borate, whereas the other component, methanol, will ordinarily be recycled for use in the production of additional methyl borate-methanol azeotrope at 10. An important advantage of the present illustrative system is its cyclic manner of operation and the ease with which that operation may be subjected to automatic control.

A particularly economic and effective solvent for inhibiting the distillation of methyl borate from the described azeotrope is a mixture of diphenyl ether ($C_6H_5OC_6H_5$) and biphenyl ($C_6H_5C_6H_5$) in a ratio of approximately 3:1 by weight, which mixture is commercially available under the trade name "Dowtherm A." Satisfactory operation is obtainable with a feed rate of Dowtherm to the distillation column between about 2 and about 10 times the feed rate of azeotrope by weight, values in the neighborhood of 4:1 being preferred. Even with separation columns C–1 and C–2 of very moderate length, the distillate from column C–2 then typically contains from 99 to 100% of trimethyl borate, and less than 4% of the total input ester is contained in the distillate from column C–1. The recycled solvent from the residue of C–2 typically contains less than 0.5% ester.

Diphenyl ether and biphenyl may also be employed separately as solvents in the described process, with suitable provision to prevent solidification of the solvent in the case of biphenyl, but are found to be less economical than the described mixture.

Although benzene is too volatile to be useful for the present purpose, substantially non-polar solvents having boiling points in the described range include halogen and short-chain alkyl derivatives of aromatic hydrocarbons containing one or two non-fused aromatic nuclei. Typical examples of such solvents, which provide effective suppression of the distillation of trimethyl borate from its methanol azeotrope are xylene [$C_6H_4(CH_3)_2$] and dichlorobenzene ($C_6H_4Cl_2$).

Paraffinic hydrocarbons containing between about eight and about fifteen carbon atoms per molecule are also effective solvents for the present purpose. For example, kerosene boiling between 204 and 245° C. produces about 80% methanol as distillate from column C–1 and substantially 100% trimethyl borate as distillate from column C–2. Kerosene is most effective when provided at a rate ratio between about 5:1 and about 10:1 with respect to the feed rate of azeotrope to the separation column. As a further example of the effectiveness of hydrocarbons of the described type, decane has been found to produce a useful degree of separation of the azeotrope components, even when supplied at a ratio as low as about 1.5:1 with respect to the azeotrope.

Trimethyl borate may be obtained in nearly pure form as distillate from column C–1 by adding a suitable polar solvent to the column in a weight ratio of from about 1:1 to about 10:1 with respect to the azeotrope. For example, when dimethylformamide [$HCON(CH_3)_2$] is added continuously to column C–1 at 15 at twice the flow rate at which the azeotrope is added at 14, the distillate is typically 98% methyl borate. The methanol fraction of the azeotrope is then recovered in substantially pure form as distillate from column C–2. The latter separation is made particularly effective by the relatively high boiling point of dimethylformamide. That advantage applies even more strongly when diethylformamide [$HCON(CH_2CH_3)_2$] is employed as solvent. Satisfactory recovery of trimethyl borate as distillate from column C–1 is also obtained by supplying methylacetamide ($CH_3CONHCH_3$), dimethylacetamide [$CH_3CON(CH_3)_2$] and methylpropionamide ($CH_3CH_2CONHCH_3$).

Use of dimethylsulfoxide ($CH_3SOCH_3$) as extraction solvent produces nearly as high a ratio of separation of the components of the azeotrope as dimethylformamide. Dimethylsulfoxide is highly effective at addition ratios as low as 1:2 by weight with respect to the azeotrope.

The distillation of methanol is also inhibited by phenol ($C_6H_5OH$) and by cresol ($CH_3C_6H_4OH$) and similar short-chain derivatives of phenol, so that when those solvents are added to distillation column C–1 the distillate obtained at the head of the column is appreciably enriched in methyl borate as compared to the azeotrope.

Mixtures of trimethyl borate and methanol in proportions other than those of the azeotrope may be considered as mixtures of the azeotrope and a definite proportion of whichever component is present in excess. Such mixtures can, of course, be separated into those parts by conventional distillation. The resulting azeotrope can then be separated into its components by the present invention. Alternatively, a mixture in which the proportions do not correspond initially to the azeotrope can be treated directly in accordance with the present invention, substantially the whole of the methyl borate of the initial mixture being obtained at the head of one column, and substantially all of the methanol being obtained at the head of the other column. When methyl borate is distilled from the first column it is generally desirable to vary the proportion of solvent supplied to the column in direct relation to the content of methanol in the initial mixture. For example, satisfactory distillation of methanol from a mixture containing 50% methyl borate and 50% methanol is obtained by supplying Dowtherm to column C–1 in a ratio of about 7:1 by weight with respect to the methyl borate-methanol mixture.

We claim:

1. The method of separating a mixture of trimethyl borate and methanol which comprises distilling said mixture in a still equipped with a reflux column, introducing into the reflux column during said distillation an organic solvent having a boiling point between about 100° C. and 275° C. said solvent selected from the group consisting of mono- and di-alkyl N-substituted formamides, acetamides and propionamides in which said alkyl groups contain from one to two carbon atoms, dimethylsulfoxide, phenol and short-chain alkyl derivatives of phenol and recovering substantially pure trimethyl borate from said distillation.

2. The method of claim 1 in which said solvent is dimethyl-formamide.

3. The method of claim 1 in which said solvent is dimethylsulfoxide.

References Cited in the file of this patent

UNITED STATES PATENTS

| | | |
|---|---|---|
| 2,575,284 | Morrell et al. | Nov. 13, 1951 |
| 2,575,285 | Carlson et al. | Nov. 13, 1951 |
| 2,588,063 | Wayo et al. | Mar. 4, 1952 |
| 2,746,984 | Rottig | May 22, 1956 |
| 2,791,550 | West et al. | May 7, 1957 |
| 2,802,018 | Ton | Aug. 6, 1957 |
| 2,880,144 | Bush | Mar. 31, 1959 |

OTHER REFERENCES

Hibshman: Industrial Engineering Chemistry, 1949, vol. 41, pp. 1366–1374.

Bradley et al.: Progress in Petroleum Technology (Advances in Chemistry Series #5), pp. 205–209, 1951.

Weissberger: "Distillation," 1951 (pp. 320–321, 325–341).